D. R. ROBINSON.
TRANSMISSION APPARATUS.
APPLICATION FILED JAN. 8, 1915.
1,212,683.
Patented Jan. 16, 1917.
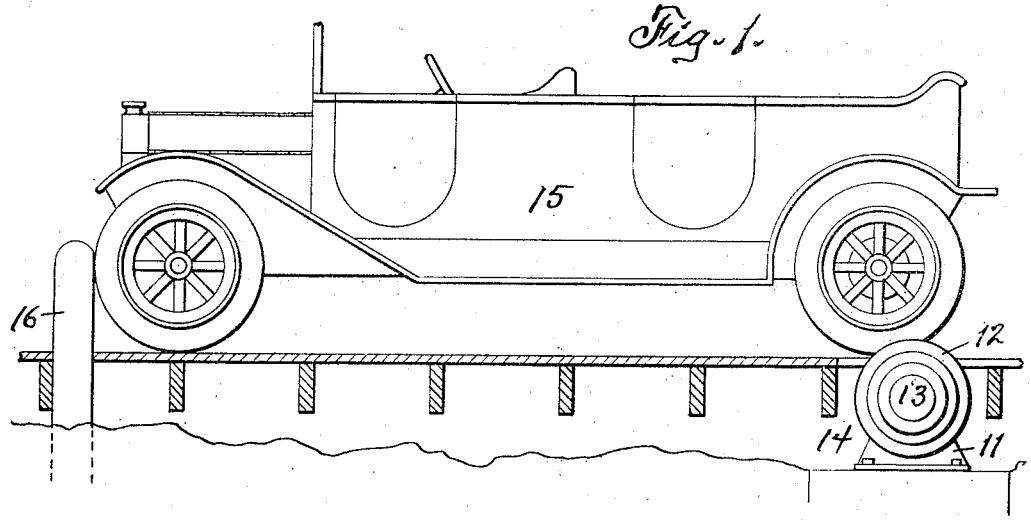
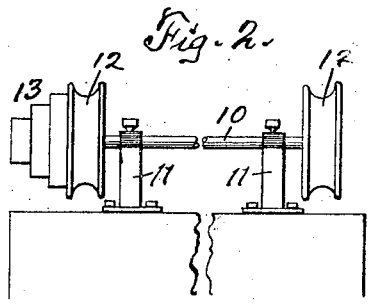
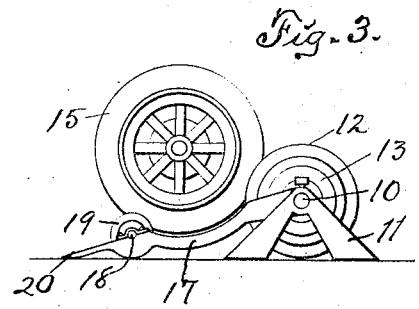
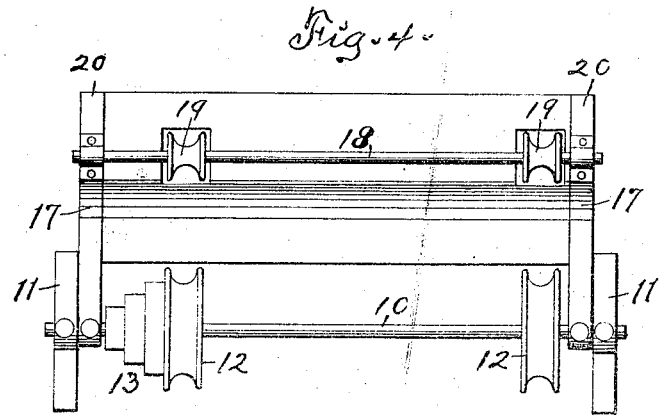
Attest:
H. G. Swift
L. R. Leibrock
Inventor:
D. Russell Robinson
By Silas L. Swift,
Atty

UNITED STATES PATENT OFFICE.

D. RUSSELL ROBINSON, OF OSCEOLA, IOWA, ASSIGNOR OF ONE-THIRD TO EMIL JARL, OF OSCEOLA, IOWA.

TRANSMISSION APPARATUS.

1,212,683.  Specification of Letters Patent.  Patented Jan. 16, 1917.

Application filed January 8, 1915. Serial No. 1,111.

*To all whom it may concern:*

Be it known that I, D. RUSSELL ROBINSON, citizen of the United States of America, and resident of Osceola, Clarke county, Iowa, have invented a new and useful Transmission Apparatus, of which the following is a specification.

The object of this invention is to provide an improved apparatus for transmitting the power of a motor or other propelled vehicle of traction type to a driven machine.

A further object of this invention is to provide improved means for driving machines such as pullers, pumps, washers, separators, emery wheels, grindstones, saws, lathes, fans, shellers, grinders, mills and the like by friction-driven power-transmitting apparatus through the medium of friction belts, chains or gears of any kind.

My invention consists in the construction, arrangement and combination of elements hereinafter set forth, pointed out in my claims and illustrated by the accompanying drawing, in which—

Figure 1 is a side elevation and Fig. 2 is a rear elevation of an apparatus designed to carry out my improvement. Fig. 3 is a side elevation and Fig. 4 is a plan of another apparatus designed to carry out my improvement.

In the construction of the apparatus as shown in Figs. 1 and 2 a shaft 10 is mounted for rotation in suitable bearings 11 and friction wheels, of grooved variety, 12 are mounted rigidly on end portions of said shaft outside of and laterally spaced from said bearings. A cone pulley 13 is mounted rigidly on one end portion of the shaft 10 and may be belted as to either of its faces to a machine to be driven (not shown). The apparatus as shown in Fig. 2, may be sunken, submerged or placed in a pit 14 and a motor-driven vehicle such as an automobile 15 may be backed against and upon the grooved friction wheels 12 and be held thereon and in advance of the vertical plane of the axis thereof, by a stop 16 or chuck placed in front of the forward wheels of the vehicle.

In the construction of the apparatus as shown in Figs. 3 and 4 the stop or chuck 16 is omitted and arms 17 are pivoted on and extended forward from the ends of the shaft 10. A shaft 18 is journaled in the forward ends of said arms 17 and idler grooved wheels 19 are mounted thereon in alinement with the friction wheels 12, and are suitably spaced therefrom. An approach or inclined track 20 is arranged in front of each idler wheel 19. The apparatus as shown in Figs. 3 and 4 may occupy a normal position on a floor or ground surface and be not submerged. In its use a motor-driven vehicle may be backed over the tracks 20 and idler wheels 19 and into contact with the friction wheels 12. The forward portion of the apparatus may be elevated by any suitable means so as to throw the major weight against and on the friction wheels 12.

It is understood the traction wheels of the vehicle will not mount the friction wheels or idler wheels by and through traction thereon or friction therewith; but they may be so mounted by continuation of travel established by traction with the floor or tracks preliminary to such mounting.

After being positioned as described the traction wheels may be driven in either direction and will, in turn, drive the friction wheels and machines belted or geared thereto.

The friction wheels 12, shaft 10 and pulley 13 constitute a friction mechanism.

A motorcycle, velocipede, bicycle or similar driver may be substituted for the automobile. Or the mechanism may be mounted on a wagon and driven by the wheels thereof.

I claim as my invention—

1. Transmission apparatus comprising friction mechanism, tracks pivoted on said friction mechanism and idler grooved wheels interposed between said tracks and friction mechanism, said tracks and idler wheels being connected and adapted to be raised and lowered relative to the axis of the friction mechanism.

2. Transmission mechanism comprising friction mechanism, arms pivoted to and leading from said friction mechanism, a shaft in said arms, grooved idler wheels on said shaft and tracks leading toward said idler wheels, said arms, shaft and idler wheels being adapted to be moved through an arc relative to the axis of the friction mechanism.

Signed by me at Des Moines, Iowa, this twenty-first day of December, 1914.

D. RUSSELL ROBINSON.

Witnesses:
   EMIL JARL,
   SILAS C. SWEET.